United States Patent
Larson, Jr. et al.

(10) Patent No.: US 10,787,274 B2
(45) Date of Patent: Sep. 29, 2020

(54) INFLIGHT STOW OF RAM AIR TURBINE

(71) Applicant: Hamilton Sundstrand Corporation, Charlotte, NC (US)

(72) Inventors: Michael E. Larson, Jr., Rockford, IL (US); Gary Sasscer, Leaf River, IL (US); Scott J. Marks, Oregon, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 691 days.

(21) Appl. No.: 15/238,146

(22) Filed: Aug. 16, 2016

(65) Prior Publication Data

US 2018/0050813 A1 Feb. 22, 2018

(51) Int. Cl.
*F01D 15/10* (2006.01)
*B64D 41/00* (2006.01)
*F01D 25/28* (2006.01)
*H02K 7/18* (2006.01)

(52) U.S. Cl.
CPC ......... *B64D 41/007* (2013.01); *F01D 15/10* (2013.01); *F01D 25/28* (2013.01); *H02K 7/1823* (2013.01); *F05D 2220/34* (2013.01); *F05D 2270/03* (2013.01)

(58) Field of Classification Search
CPC ....... B64D 41/007; F01D 15/10; F01D 25/28; H02K 7/1823; F05D 2220/34; F05D 2270/03
See application file for complete search history.

(56) References Cited

U.S. PATENT DOCUMENTS 3,149,678 A   9/1964 Chilman et al.
4,676,458 A * 6/1987 Cohen .................. B64D 41/007
                                                  244/58

(Continued)

FOREIGN PATENT DOCUMENTS

EP   2985472 A2   2/2016
GB    987032      3/1965

(Continued)

OTHER PUBLICATIONS

European Search Report Issued in EP Application No. 17193346.0, dated Dec. 19, 2017, 9 Pages.

*Primary Examiner* — Aaron R Eastman
*Assistant Examiner* — Theodore C Ribadeneyra
(74) *Attorney, Agent, or Firm* — Cantor Colburn LLP

(57) ABSTRACT

A ram air turbine system includes a ram air turbine and an actuator to move the ram air turbine between a stowed position and a deployed position. The actuator is in fluid communication with an aircraft hydraulic system configured to return the ram air turbine to the stowed position from the deployed position during operation of the aircraft utilizing hydraulic fluid pressure from the aircraft hydraulic system. A method of operating a ram air turbine system includes slowing or stopping rotation of the ram air turbine during flight of the aircraft, directing hydraulic fluid pressure from an aircraft hydraulic system to a ram air turbine actuator to urge movement of the actuator from a deployed position to a stowed position and urging movement of the ram air turbine from a deployed position to a stowed position via movement of the actuator from the deployed position to the stowed position.

10 Claims, 2 Drawing Sheets

(56) References Cited

U.S. PATENT DOCUMENTS

| | | | | |
|---|---|---|---|---|
| 4,717,095 A * | 1/1988 | Cohen | .................. | B64D 41/007 244/58 |
| 4,742,976 A * | 5/1988 | Cohen | .................. | B64D 41/007 244/58 |
| 4,991,796 A * | 2/1991 | Peters | .................. | B64D 41/007 244/58 |
| 5,123,614 A * | 6/1992 | Whitehouse | ......... | B64D 41/007 244/102 SL |
| 5,174,719 A * | 12/1992 | Walsh | .................. | B64D 41/007 184/6.11 |
| 5,398,780 A * | 3/1995 | Althof | .................. | B64D 41/007 185/39 |
| 5,820,074 A | 10/1998 | Trommer et al. | | |
| 6,331,099 B1 * | 12/2001 | Eccles | .................. | B64D 41/007 416/142 |
| 8,136,759 B2 | 3/2012 | Lavigne et al. | | |
| 8,505,849 B2 | 8/2013 | Dubuisson et al. | | |
| 8,602,736 B2 | 12/2013 | Russ | | |
| 8,657,227 B1 | 2/2014 | Bayliss et al. | | |
| 9,108,742 B2 | 8/2015 | Russ | | |
| 2009/0121077 A1 * | 5/2009 | Lynas | .................. | B64C 25/22 244/58 |
| 2010/0023169 A1 * | 1/2010 | Delaloye | .................. | F01D 25/20 700/282 |
| 2010/0158698 A1 * | 6/2010 | Russ | .................. | B64D 41/007 416/244 A |
| 2011/0229309 A1 * | 9/2011 | Russ | .................. | B64D 41/007 415/126 |
| 2012/0056601 A1 * | 3/2012 | Spierling | ............... | B64D 15/12 322/34 |
| 2012/0297924 A1 * | 11/2012 | Lang | .................. | B64D 41/007 74/99 R |
| 2012/0328436 A1 * | 12/2012 | Soidel | .................. | B64D 41/007 416/47 |
| 2013/0181448 A1 | 7/2013 | Larson et al. | | |
| 2013/0287569 A1 * | 10/2013 | Bannon | .................. | F01D 25/28 416/46 |
| 2013/0292509 A1 * | 11/2013 | Russ | .................. | B64D 41/007 244/58 |
| 2013/0292510 A1 * | 11/2013 | Russ | .................. | B64D 41/007 244/58 |
| 2014/0054893 A1 * | 2/2014 | Lindholdt | ............. | F03D 7/0276 290/44 |
| 2014/0309818 A1 * | 10/2014 | Seagren | ............... | B64D 41/007 701/3 |
| 2015/0096437 A1 | 4/2015 | Russ | | |
| 2015/0232195 A1 | 8/2015 | Bannon | | |

FOREIGN PATENT DOCUMENTS

| | | |
|---|---|---|
| GB | 2257477 A | 1/1993 |
| GB | 1052706 A | 1/2001 |

* cited by examiner

INFLIGHT STOW OF RAM AIR TURBINE

BACKGROUND

The subject matter disclosed herein relates to actuators for aircraft systems. More particularly, the present disclosure relates to deployment mechanisms for linear actuators.

Aircraft include many systems activated and/or controlled by actuators. One such system is a Ram Air Turbine (RAT). The ram air turbine is a turbine utilized to generate emergency power for the aircraft in the case of a loss of primary power. The ram air turbine is typically stowed inside the aircraft fuselage or wing, and is only deployed as needed. The ram air turbine is held in the stowed position by a locked linear actuator, and when the actuator is unlocked, the actuator extends to deploy the ram air turbine.

Deployment of the RAT inflight, either intentionally or inadvertently, causes the aircraft to either divert to the nearest airfield and land thus resulting in an unscheduled landing of the aircraft, or to continue flight with the RAT deployed after need for the RAT is ended. This condition is not desired as it results in decreased aircraft performance due to the additional drag from the RAT being exposed to the airstream, increased noise levels due to the RAT operating, and consuming a portion of the service life of the RAT. Additionally, the RAT is susceptible to foreign object damage (FOD) during landing when deployed. Stowing the RAT prior to landing will prevent FOD.

SUMMARY

In one embodiment, a ram air turbine system for an aircraft includes a ram air turbine and an actuator to move the ram air turbine between a stowed position and a deployed position. The actuator is in fluid communication with an aircraft hydraulic system configured to return the ram air turbine to the stowed position from the deployed position during operation of the aircraft utilizing hydraulic fluid pressure from the aircraft hydraulic system.

Additionally or alternatively, in this or other embodiments a turbine lock is engagable with the ram air turbine to lock a rotational position of the ram air turbine prior to moving the ram air turbine from the deployed position to the stowed position.

Additionally or alternatively, in this or other embodiments a turbine speed and rotational position sensor is configured such that the turbine lock is engaged at a preselected rotational speed and/or position.

Additionally or alternatively, in this or other embodiments the ram air turbine includes a turbine hub rotatable about a turbine axis and a plurality of blades extending from the turbine hub.

Additionally or alternatively, in this or other embodiments a blade feathering control is configured to rotate the plurality of blades of the ram air turbine about their respective blade axes to slow and/or stop rotation of the ram air turbine.

Additionally or alternatively, in this or other embodiments a hydraulic pump/motor is operably connected to the ram air turbine and the aircraft hydraulic system to slow and/or stop rotation of the ram air turbine via the application of hydraulic fluid pressure from the aircraft hydraulic system.

Additionally or alternatively, in this or other embodiments the hydraulic pump motor supplies hydraulic fluid pressure to the aircraft hydraulic system during operation of the ram air turbine.

Additionally or alternatively, in this or other embodiments an electric generator is operably connected to the ram air turbine to generate electrical power during operation of the ram air turbine.

In another embodiment, a method of operating a ram air turbine system of an aircraft includes slowing or stopping rotation of the ram air turbine during flight of the aircraft, directing hydraulic fluid pressure from an aircraft hydraulic system to a ram air turbine actuator to urge movement of the actuator from a deployed position to a stowed position and urging movement of the ram air turbine from a deployed position to a stowed position via movement of the actuator from the deployed position to the stowed position.

Additionally or alternatively, in this or other embodiments the method includes sensing a ram air turbine rotational speed and/or position.

Additionally or alternatively, in this or other embodiments the method includes locking the rotational position of the ram air turbine when the rotational speed and/or position reaches a selected value.

Additionally or alternatively, in this or other embodiments the method includes locking the rotational position of the ram air turbine via engagement of a locking pin with the ram air turbine.

Additionally or alternatively, in this or other embodiments the method includes feathering a plurality of ram air turbine blades to slow rotation of the ram air turbine.

Additionally or alternatively, in this or other embodiments the method includes slowing rotation of the ram air turbine via the application of hydraulic fluid pressure from the aircraft hydraulic system to a hydraulic pump/motor operably connected to the ram air turbine.

Additionally or alternatively, in this or other embodiments the hydraulic pump/motor supplies hydraulic fluid pressure to the aircraft hydraulic system during operation of the ram air turbine.

Additionally or alternatively, in this or other embodiments the slowing or stopping rotation of the ram air turbine is in response to a command from an aircraft crew or flight control system.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
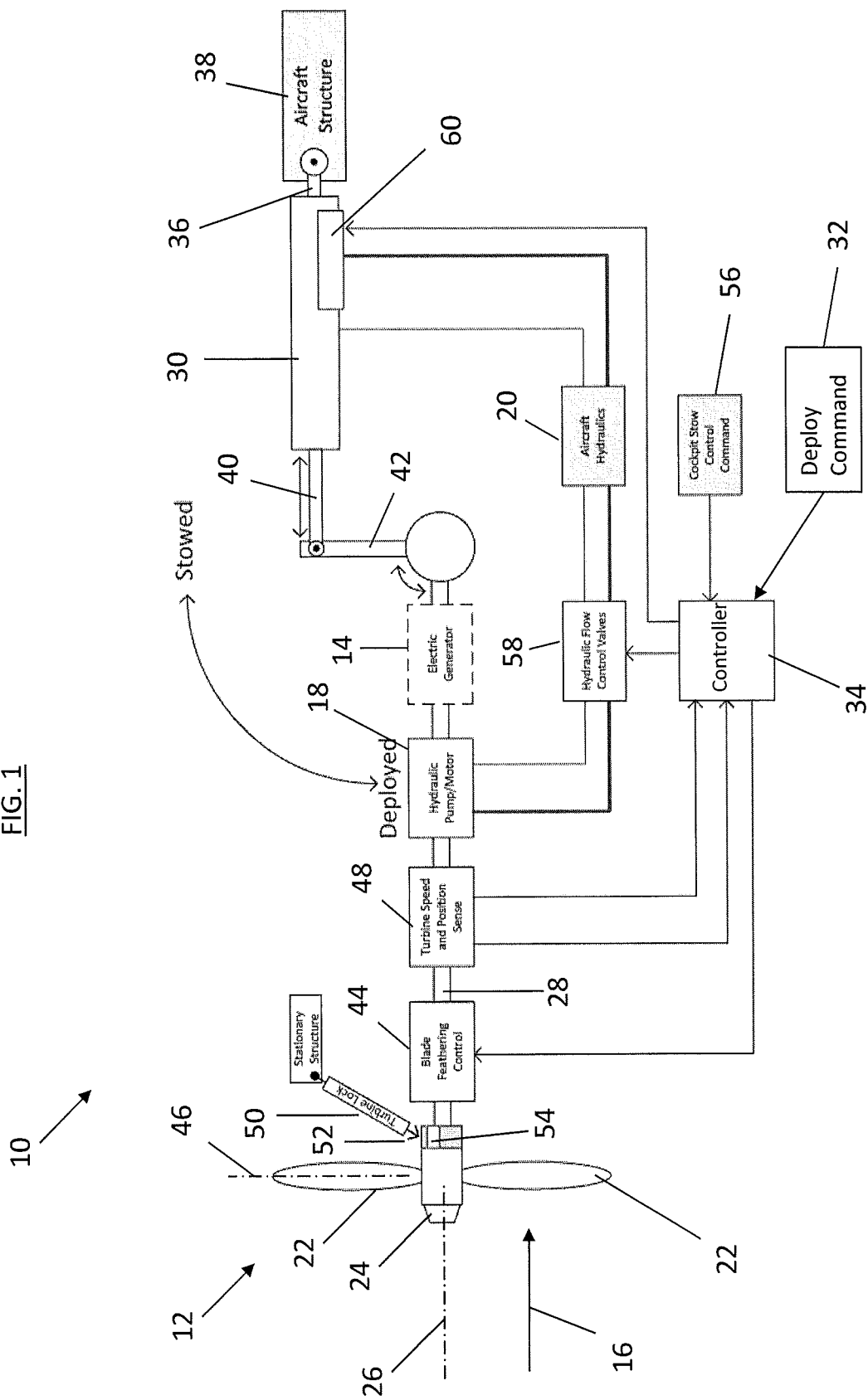
FIG. 1 is a schematic view of a stowable ram air turbine system.

Referring now to FIG. 1, shown is a schematic view of an embodiment of a ram air turbine (RAT) system 10. The system 10 includes a ram air turbine 12 operably connected to an electrical generator 14. When the ram air turbine 12 is in a deployed position, a flow of air 16 past the ram air turbine 12 drives rotation of the ram air turbine 12, which in turn operates the electrical generator 14 to generate electrical power for use by an aircraft (not shown) from which the ram air turbine 12 is deployed. Further, the ram air turbine 12 is operably connected to a hydraulic pump/motor 18 such that rotation of the ram air turbine 12 drives the hydraulic pump/motor 18 to supply hydraulic fluid pressure to an aircraft hydraulic system 20.

The ram air turbine 12 includes a plurality of blades 22 extending from a turbine hub 24, which is rotatable about a turbine axis 26. The ram air turbine 12 has an output shaft 28 through which the electrical generator 14 and the hydraulic pump/motor 18 are connected to the ram air turbine 12. It is to be appreciated that while a shaft connection is shown herein, other connections, such as a belt connection, may be utilized.

The ram air turbine 12 is further connected to an actuator 30, in some embodiments, a linear actuator 30 to move the ram air turbine 12 from a stowed position to a deployed position upon receipt of a deploy command 32 from a controller 34. The actuator has a first end 36 secured to a fixed aircraft structure 38, such as an airframe component, and a second end 40 connected to the ram air turbine 12 through, for example, a linkage 42.

The ram air turbine 12 includes a blade feathering control 44 to control and/or adjust blade 22 position relative to the flow of air 16 by selectable rotating the blades 22 about a blade axis 46. Further, the ram air turbine 12 includes a position and speed sensor 48 to determine rotational position and speed of the ram air turbine 12. A turbine lock 50 is engagable with the ram air turbine 12 to prevent rotation of the ram air turbine 12. In some embodiments, the turbine lock 50 includes a lock pin 52 which is engagable with a turbine slot 54 in the ram air turbine 12.

Figure 2:
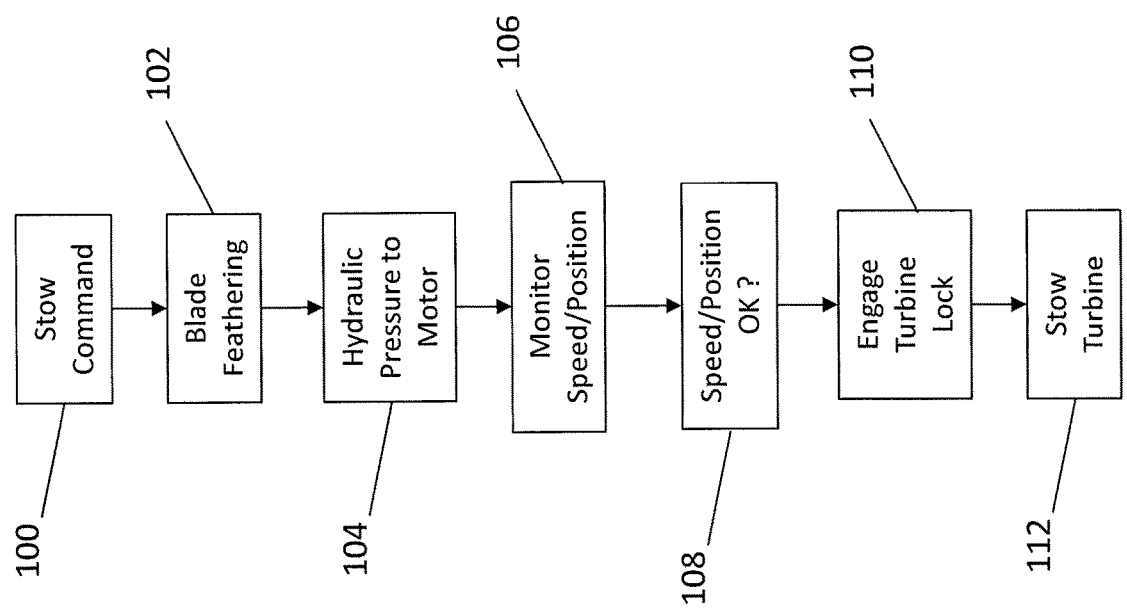
FIG. 2 is a flow diagram of a method for stowing a ram air turbine during aircraft operation.

Referring now to the schematic of FIG. 2, the ram air turbine system 10 is configured to move the ram air turbine 12 from the deployed position shown in FIG. 1 to a stowed position, during flight of the aircraft. The aircraft may continue its scheduled operation without the increased drag and noise from the deployed ram air turbine 12. Initially, at block 100 the controller 34 receives a stow command 56 (FIG. 1) from, for example, a flight crew of the aircraft or a flight control system of the aircraft.

At block 102, the controller 34 commands the blade feathering control 44 to feather or rotate the blades 22 so the blades are substantially aligned with the flow of air 16 to reduce forces acting on the blades 22. At block 104, the controller 34 commands hydraulic control valves 58 (shown in FIG. 1) to direct hydraulic fluid from the aircraft hydraulic system 20 to the hydraulic pump/motor 18 thus causing operation of the hydraulic pump/motor 18 as a motor. Operation of the hydraulic pump/motor 18 as a motor slows rotation of the ram air turbine 12 about the turbine axis 26. In block 106, the controller monitors turbine speed and rotational position via the position and speed sensor 48.

In block 108 the controller 34 determines if the rotational speed and the rotational position of the ram air turbine 12 allow for engagement of the turbine lock 50 to lock the position of the ram air turbine 12 for stow. If the rotational position is correct, the turbine lock 50 is engaged at block 110. Alternatively, if the rotational position is not correct, the ram air turbine 12 is slowly clocked by, for example, adjustment of the blade feathering control 44 or the hydraulic pressure at the hydraulic pump/motor 18. When the turbine speed and position sensor 48 senses the correct position, the controller 34 then engages the turbine lock 50.

Once the turbine lock 50 is engaged at block 110, at block 112 the controller 34 signals the hydraulic control valves 58 to direct hydraulic fluid pressure from the aircraft hydraulic system 20 to a stow solenoid 60 of the actuator 30, to move the actuator 30 from the deployed position to the stowed position, which in turn moves the ram air turbine 12 from the deployed position to the stowed position.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A ram air turbine system for an aircraft, comprising:
   a ram air turbine including:
      a turbine hub rotatable about a turbine axis; and
      a plurality of blades extending from the turbine hub;
   an actuator to move the ram air turbine between a stowed position and a deployed position, the actuator in fluid communication with an aircraft hydraulic system configured to return the ram air turbine to the stowed position from the deployed position during operation of the aircraft utilizing hydraulic fluid pressure from the aircraft hydraulic system;
   a hydraulic pump/motor operably connected to the ram air turbine and the aircraft hydraulic system to slow and/or stop rotation of the ram air turbine via the application of hydraulic fluid pressure from the aircraft hydraulic system to operate the hydraulic pump/motor as a motor thereby slowing and/or stopping rotation of the ram air turbine about the turbine axis; and
   a turbine lock engagable with the ram air turbine to lock a rotational position of the ram air turbine prior to moving the ram air turbine from the deployed position to the stowed position, the turbine lock including:
      a lock pin extending from a stationary structure; and
      a turbine slot in the ram air turbine receptive of the lock pin;
      wherein the ram air turbine is not movable from the deployed position to the stowed position unless the lock pin is engaged in the turbine slot.

2. The ram air turbine system of claim 1, further comprising a turbine speed and rotational position sensor configured such that the turbine lock is engaged at a preselected rotational speed and/or position.

3. The ram air turbine system of claim 1, further comprising a blade feathering control configured to rotate the plurality of blades of the ram air turbine about their respective blade axes to slow and/or stop rotation of the ram air turbine.

4. The ram air turbine system of claim 1, wherein the hydraulic pump/motor supplies hydraulic fluid pressure to the aircraft hydraulic system during operation of the ram air turbine.

5. The ram air turbine of claim 1, further comprising an electric generator operably connected to the ram air turbine to generate electrical power during operation of the ram air turbine.

6. A method of operating a ram air turbine system of an aircraft, comprising:
   slowing or stopping rotation of a ram air turbine during flight of the aircraft;

directing hydraulic fluid pressure from an aircraft hydraulic system to a ram air turbine actuator to urge movement of the actuator from a deployed position to a stowed position;

urging movement of the ram air turbine from a deployed position to a stowed position via movement of the actuator from the deployed position to the stowed position; and slowing rotation of the ram air turbine about a turbine axis via the application of hydraulic fluid pressure from the aircraft hydraulic system to a hydraulic pump/motor operably connected to the ram air turbine and operating as a motor;

sensing a ram air turbine rotational speed and/or position; and locking the rotational position of the ram air turbine when the rotational speed and/or position reaches a selected value, wherein a turbine lock includes:

a lock pin extending from a stationary structure; and
a turbine slot in the ram air turbine receptive of the lock pin;
wherein the ram air turbine is not movable from the deployed position to the stowed position unless the lock pin is engaged in the turbine slot.

7. The method of claim 6, further comprising locking the rotational position of the ram air turbine via engagement of a locking pin with the ram air turbine.

8. The method of claim 6, further comprising feathering a plurality of ram air turbine blades to slow rotation of the ram air turbine.

9. The method of claim 6, wherein the hydraulic pump/motor supplies hydraulic fluid pressure to the aircraft hydraulic system during operation of the ram air turbine.

10. The method of claim 6, wherein the slowing or stopping rotation of the ram air turbine is in response to a command from an aircraft crew or flight control system.

* * * * *